L. W. CARDEN.
NUT LOCK.
APPLICATION FILED OCT. 31, 1919.
1,327,373.
Patented Jan. 6, 1920.
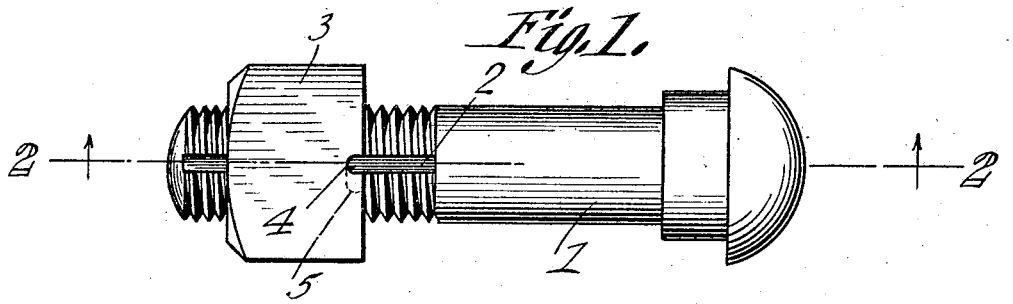
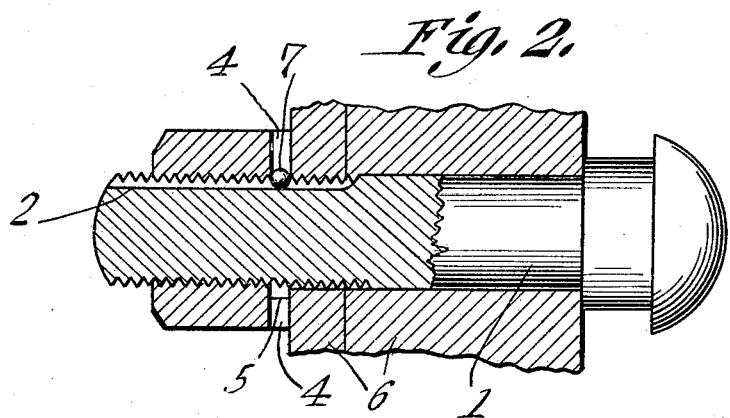
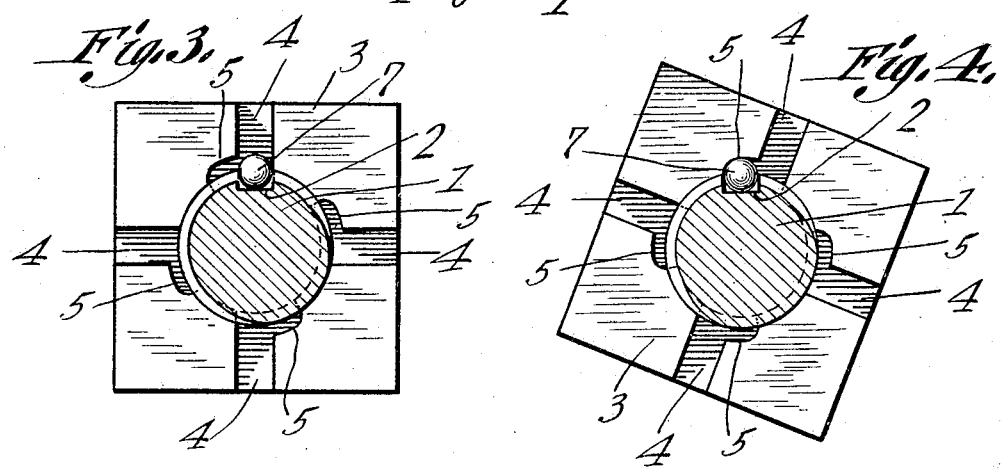
L. W. Carden
Inventor

UNITED STATES PATENT OFFICE.

LUTHER W. CARDEN, OF CHEROKEE, ALABAMA.

NUT-LOCK.

1,327,373. Specification of Letters Patent. Patented Jan. 6, 1920.

Application filed October 31, 1919. Serial No. 334,745.

*To all whom it may concern:*

Be it known that I, LUTHER W. CARDEN, a citizen of the United States, residing at Cherokee, in the county of Colbert and State of Alabama, have invented a new and useful Nut-Lock, of which the following is a specification.

The device forming the subject matter of this application is a nut lock and the invention aims to provide a means whereby, through the instrumentality of a single ball, a nut may be locked against reverse rotation with respect to a bolt.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Fig. 2 is a section taken approximately on the line 2—2 of Fig. 1, parts appearing in elevation; Fig. 3 is an end elevation showing the parts as they will appear after the ball has been inserted and before the nut has been locked; and Fig. 4 is an elevation showing the parts as they will appear after the nut has been locked.

The numeral 1 denotes a bolt having a longitudinal seat or groove 2, which may be of any desired length. A nut 3 is threaded on the bolt 1. On the inner end of the nut 3 there are open sided radial grooves 4 having circumferential extensions 5 located adjacent to the bolt 1. There may be any desired number of these grooves 4. The nut 3 is rotated to a seat against the material 6 which is to be held by the nut, one of the grooves 4 in the nut being alined with the seat 2 in the bolt 1. Then, a ball 7, preferably made of steel, is dropped into the groove 4 between the nut 3 and the material 6, the ball entering the seat 2 in the bolt 1. A slight reverse rotation then is imparted to the nut, whereupon the ball 7, held in the seat 2 of the bolt 1, passes into the extension 5, as shown in Fig. 4. It will be obvious that when the parts are arranged as shown in Fig. 4, the nut 3 can be rotated reversely no farther: nor can the ball escape through the groove 4. Since the grooves 4 and their extensions 5 are open-sided, and are formed in the end of the nut 3, the device can be made at trifling expense.

Having thus described the invention, what is claimed is:—

1. The combination with a bolt having a longitudinal seat, of a nut on the bolt and provided with a transverse opening adapted to communicate with the seat, the opening having a circumferential extension located adjacent to the bolt; and a ball insertible into the seat by way of the opening, the ball being lodged in the seat and the extension when a reverse rotation is imparted to the nut.

2. The combination with a bolt having a longitudinal seat, of a nut on the bolt and provided on its inner end with an open sided groove adapted to communicate with the seat, the groove having an open sided extension located adjacent to the bolt, the material wherewith the nut coacts forming a closure for the open side of the groove and its extension; and a ball insertible in the seat by way of the groove, the ball being lodged in the extension and in the seat when reverse rotation is imparted to the nut.

In testimony that I claim the foregoing as my own, I have hereto affixed my signature in the presence of two witnesses.

LUTHER W. CARDEN.

Witnesses:
J. B. PRIDE,
J. N. McCAIG.